United States Patent
Wakayama et al.

[19]

[11] Patent Number: 6,018,307
[45] Date of Patent: Jan. 25, 2000

[54] METEOROLOGICAL RADAR SYSTEM

[75] Inventors: Toshio Wakayama; Kiyoyuki Hata; Hisamichi Tanaka, all of Tokyo, Japan

[73] Assignee: Mitsubishi Denki Kabushiki Kaisha, Tokyo, Japan

[21] Appl. No.: 09/166,170

[22] Filed: Oct. 5, 1998

[51] Int. Cl.[7] .................................................. G01S 13/95
[52] U.S. Cl. ............................... 342/26; 342/96; 342/179
[58] Field of Search ................................. 342/26, 73, 90, 342/96, 176, 178, 179, 180, 197

[56] References Cited

U.S. PATENT DOCUMENTS

| | | | |
|---|---|---|---|
| 3,573,824 | 4/1971 | Armstrong et al. | 342/26 |
| 3,810,173 | 5/1974 | Kirkpatrick | 342/26 |
| 4,347,618 | 8/1982 | Kavouras et al. | 375/259 |
| 4,649,388 | 3/1987 | Atlas | 342/26 |
| 4,663,630 | 5/1987 | Numaho et al. | 342/176 |
| 4,678,969 | 7/1987 | Schwerdt et al. | 315/382 |
| 5,049,886 | 9/1991 | Seitz et al. | 342/26 |
| 5,077,558 | 12/1991 | Kuntman | 342/26 |
| 5,392,048 | 2/1995 | Michie | 342/26 |
| 5,717,589 | 2/1998 | Thompson et al. | 364/420 |

FOREIGN PATENT DOCUMENTS 61-41979  2/1986  Japan.

*Primary Examiner*—John B. Sotomayor
*Attorney, Agent, or Firm*—Rothwell, Figg, Ernst & Kurz, P.C.

[57] ABSTRACT

A meteorological radar system that can continuously and detailed observe an object. The search radar section continuously searches for an atmospheric phenomenon as a target within a wide search range while the search radar control section rotatably scans the search radar antenna. The scanning range deciding section decides the scanning range of an observation radar section from the location of an atmospheric phenomenon detected by the atmospheric phenomena detecting section with the data obtained by the search radar section and thus sets the observation radar control section in the observation radar section to the scanning range. The observation radar antenna can continuously observe a narrow scanning area corresponding to an object with narrowed beams while the search radar section continues its searching operation, so that an object can be measured with high space and time resolution.

10 Claims, 16 Drawing Sheets

METEOROLOGICAL RADAR SYSTEM

BACKGROUND OF THE INVENTION

1. Field of the Invention

The present invention relates to a meteorological radar system that detects and observes moving objects.

2. Description of the Related Art

In meteorology, radar is used to gather information related to atmospheric phenomena through a process of transmitting electromagnetic waves which is scattered by objects, such as water droplets distributed in the air due to certain atmospheric phenomena, and receiving the scattered echoes. An ordinary meteorological radar system, for example, searches a circular area by rotatably sweeping its azimuth. CAPPI (Constant Altitude Plan Position Indicator) scanning is exemplified as a method of observing the weather conditions within a half spherical observation area. In CAPPI scanning, the search radar antenna transmits and receives beams at different elevation angles and at different angles in azimuth by performing both a rotational scanning operation in azimuth and an elevation angle varying operation. For example, in this scanning operation, each time the antenna is rotated once in its azimuth, the altitude is sequentially changed by a certain angle.

For meteorological study purposes, the radar equipment can fully work by scanning with only the area where atmospheric phenomena to be detected exist. Therefore, by setting the radar scanning range according to the location of atmospheric phenomena and the space area, an observer can observe an object with higher resolution than is possible with observation over all directions and all ranges.

In order to detect moving objects (e.g. fog or thundercloud) which may occur at any arbitrary point in an observation area, a conventional meteorological radar system such as described above must scan the entire observation area by continuously scanning its antenna in all angles in the azimuth and in wide range of elevation angles, without regard to the presence or absence of an object.

However, a conventional radar system has a disadvantage in that it requires a large time to observe all observation areas, thus deteriorating the time resolution for observation.

Further problem is that the CAPPI scanning operation generally degrades the space resolution at certain elevation angles because observations at selected elevation angles are skipped to reduce the time required for one CAPPI operation period.

Furthermore, this type of meteorological radar system has a disadvantage in that, when the observation area in the radius direction is set to a wider range, the space resolution remarkably decreases for observation areas distant from the location of the meteorological radar system because it largely diverges in the direction perpendicular to the line of sight.

A decrease in space resolution makes it difficult to observe in detail the internal structure of atmospheric phenomena, so that it becomes impossible to provide a precise weather forecast or report.

One approach to deal with the above-mentioned problems has been to use a meteorological radar system employing a RHI (Range Height Indicator) scanning operation (hereinafter referred to as RHI meteorological radar). However, this approach has a disadvantage in that the limited observation range of the meteorological radar system makes it impossible to observe other atmospheric phenomena which may occur outside of the observation range.

SUMMARY OF THE INVENTION

The present invention is made to solve the above-mentioned problems. Moreover, an objective of the invention is to provide a meteorological radar system that can detect and observe effectively and with high precision weather phenomena which occur, move, and disappear within an observable area.

According to one aspect of the present invention, a meteorological radar system for detecting and observing a moving object comprises an observation radar antenna to be directed to the object; a search data capturing section for capturing search data on a search area; an object location detecting section for detecting the location of the object based on the search data to obtain location information; a scanning range deciding section for deciding a scanning range of the observation radar antenna based on said location information detected; and an observation radar control section for scanning and driving the observation radar antenna based on the scanning range.

In the meteorological radar system according to the present invention, the search data capturing section may comprise a search radar antenna for scanning the search area; and a search radar control section for scanning and driving the search radar antenna.

According to another aspect of the present invention, the search radar control section implements a three-dimensional scanning operation using the search radar antenna, the three-dimensional scanning operation including a rotational scanning in azimuth and an elevation angle varying operation.

According to another aspect of the present invention, the search radar antenna transmits a fan-shaped beam spreading at an elevation angle and the search radar control section controls the search radar antenna to rotationally scan in azimuth and an elevation angle varying operation.

According to another aspect of the present invention, the search data capturing section further comprises a search data processing section for creating search data corresponding to a constant altitude PPI (Plane Position Indicator) presentation from data obtained through said three-dimensional scanning.

According to another aspect of the present invention, the search radar antenna transmits a fan-shaped beam spreading at an elevation angle and the search radar control section controls the search radar antenna to rotationally scan in azimuth.

According to another aspect of the present invention, a meteorological radar system for detecting and observing a moving object, comprises an observation radar antenna to be directed to the object; a search data capturing section for capturing search data in a search area, said search data capturing section including a search radar antenna for scanning the search area and a search radar control section for scanning and driving the search radar antenna; an object location detecting section for detecting the location of the object based on the search data to obtain location information; a scanning range deciding section for deciding a scanning range of the observation radar antenna based on the location information detected; an observation radar control section for scanning and driving the observation radar antenna based on the scanning range; and a movement forecasting section for forecasting the location of the object based on previous search data obtained with the search radar antenna.

According to still another aspect of the present invention, a meteorological radar system for detecting and observing a moving object, comprises an observation radar antenna to be directed to the object; a search data capturing section for capturing search data in a search area, said search data capturing section including a search radar antenna for scanning the search area and a search radar control section for scanning and driving the search radar antenna; an object location detecting section for detecting the location of the object based on the search data to obtain location information; a scanning range deciding section for deciding a scanning range of the observation radar antenna based on the location information detected; an observation radar control section for scanning and driving the observation radar antenna based on the scanning range; and a movement forecasting section for forecasting the location of the object based on previous high-resolution observation data obtained with the search radar antenna.

Moreover, according to yet another aspect of the present invention, a meteorological radar system for detecting and observing a moving object comprises plural observation radar antennas to be directed to said object, said antennas each placed at a different location; a search radar antenna for scanning a search area; and a control section connected to the plural observation radar antennas and the search radar antenna, for controlling the scanning and drive operation of the plural observation radar antennas and the search radar antenna; the control section including a search radar control section for scanning and driving the search radar antenna; an object location detecting section for detecting the location of the object based on search data to obtain location information; a scanning range deciding section for deciding respective scanning ranges of the plural observation radar antennas based on the location information detected; observation radar control section for respectively scanning and driving the plural observation radar antennas based on the scanning ranges; and a high-resolution observation data processing section for creating high-resolution observation data of the object based on data received by each of the plural observation radar antennas.

BRIEF DESCRIPTION OF THE DRAWINGS

This and other objects, features, and advantages of the present invention will become more apparent upon a reading of the following detailed description and drawings, in which.

DESCRIPTION OF THE PREFERRED EMBODIMENTS

Preferred embodiments of the present invention will next be described below with reference to the attached drawings.

Embodiment 1

Figure 1:
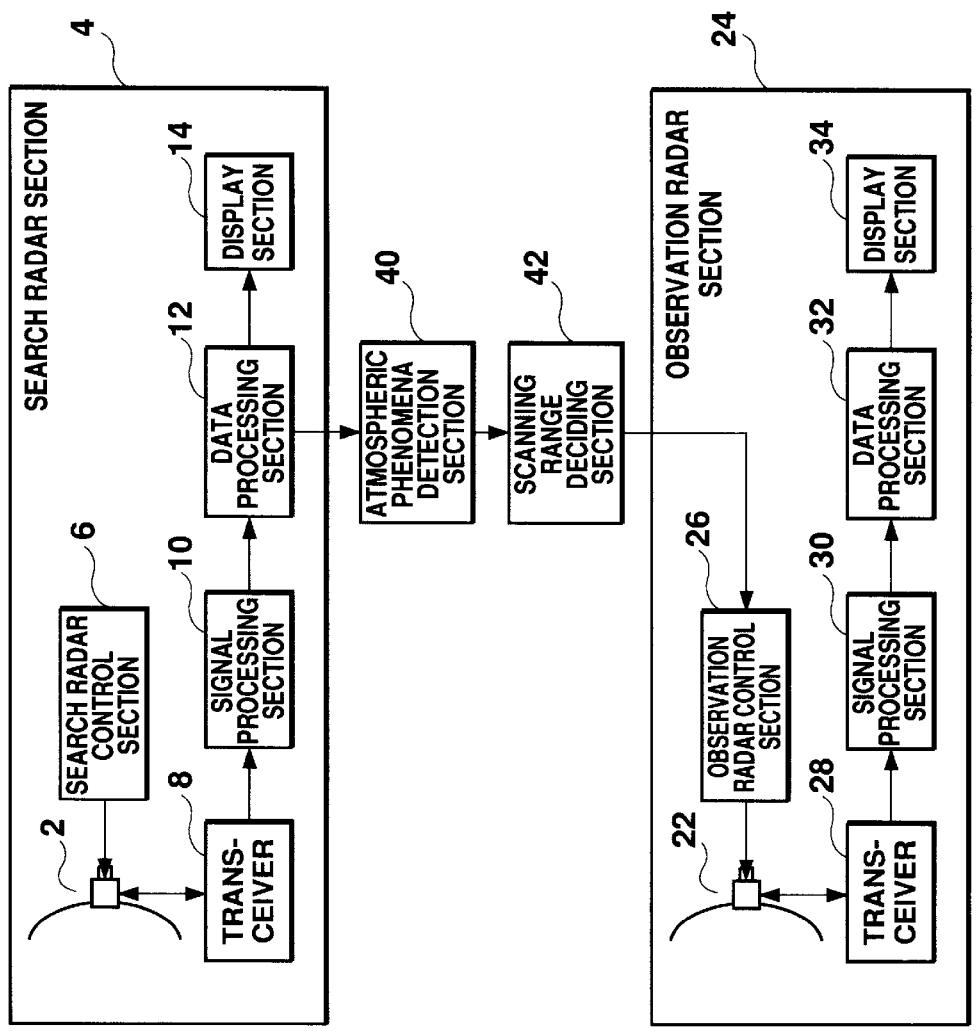
FIG. 1 is a block diagram schematically illustrating a meteorological radar system according to a first embodiment of the present invention.

FIG. 1 is a block diagram schematically illustrating a meteorological radar system according to a first embodiment of the present invention. The meteorological radar system comprises two radar antennas including a search radar antenna 2 and an observation radar antenna 22. The search radar antenna 2 is part of the search radar section 4 being the search data capturing section. In order to drive the search radar antenna 2 and to transmit and receive radio waves, the search radar section 4 further includes a search radar control section 6, a transceiver 8, a signal processing section 10, a data processing section 12, and a display section 14. The observation radar antenna 22 is part of the observation radar section 24. In order to drive the observation antenna 22 and to transmit and receive radio waves, the observation radar section 24 further comprises an observation radar control section 26, a transceiver 28, a signal processing section 28, a data processing section 32, and a display section 34. An atmospheric phenomena detecting section 40 and a scanning range deciding section 42 are disposed between the search radar section 4 and the observation radar section 24.

Each of the transceiver sections 8 and 28 includes a TR (Transmit/Receive) switching circuit used for a changeover operation between transmission and reception of radio waves, a transmission circuit, and a receiver circuit. The search radar antenna 2 or the observation radar antenna 22 radiates as beam-shaped radio waves transmission signals transmitted from the transmission circuit via the TR switching circuit.

In this system, pencil beams (narrow beams) with high space resolution are used for the search radar antenna 2 and the observation radar antenna 22. Usually the beam width is about 1°. When the transceiver 8 supplies a transmission signal to the search radar antenna for a certain time, the TR switching circuit connects the search radar antenna to the receiver. The receiver receives radio-wave echoes received by the search radar antenna. When the transceiver 28 supplies a transmission signal to the observation radar antenna for a certain time, the TR switching circuit connects it to the receiver. The receiver amplifies and down converts the signals received by the observation radar antenna and thereby generates video signals.

The search radar control section 6 controls the direction of the search radar antenna 2 to perform a CAPPI scanning operation. The observation radar control section 26 scan-drives the direction of the observation radar antenna 22 to transmit and receive radio waves to and from a pointed area in the celestial sphere, as will be described later.

Each of the signal processing sections 10 and 30 subjects received signals to a signal processing including computations of echo strength, Doppler velocity, Doppler velocity difference, and the like. The data processing section 12 converts data obtained by received signals to a form suitable for the display section 14. The data processing section 32 converts data obtained by received signals in the form suitable for the display section 34. The data processing section 12, for example, reconfigures data obtained through the CAPPI scanning operation based on azimuth, elevation angle, and echo distance and extracts the echo strength on the plane at a constant altitude. The display section 14 displays resultant data processed in the data processing section 12 on the screen. The display section 34 displays resultant data processed in the data processing section 32 on the screen.

The atmospheric phenomena detecting section 40 acts as an object location detecting section that detects the location of predetermined atmospheric phenomena to be observed based on data obtained through signals received with the search radar antenna 2. The atmospheric phenomena detecting section 40, for example, detects cumulonimbus, thunderclouds, or wind shear. For example, detection of thunderclouds is determined when the degree of thundercloud occurrence risk, or parameter obtained based on echo strength and/or upper air observation data, in an area exceeds a threshold while the area has more than a predetermined size. Moreover, the window shear is detected as the region where the space differentiation of the Doppler velocity field has a large value.

The scanning range deciding section 42 specifies, for example, the azimuth range and elevation angle range in the scanning direction of the observation radar antenna 22 according to the location of an atmospheric phenomenon detected by the atmospheric phenomena detecting section 40. The scanning range deciding section 42 sends its output to the observation radar control section 26 to control the scanning drive operation of the observation radar antenna 22.

Figure 2:
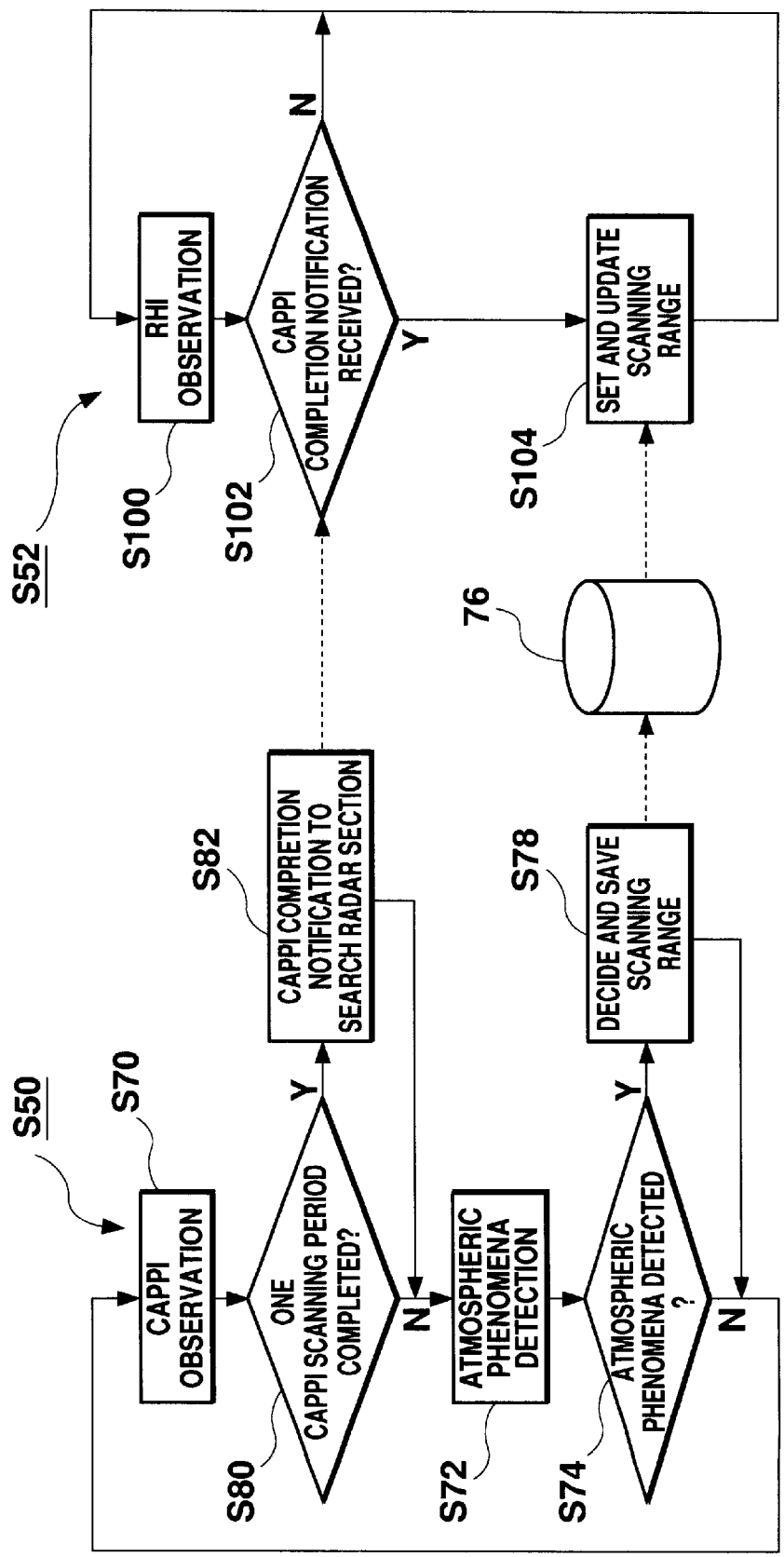
FIG. 2 is a flowchart roughly showing the process flow in the meteorological radar system according to the first embodiment.
Figure 3:
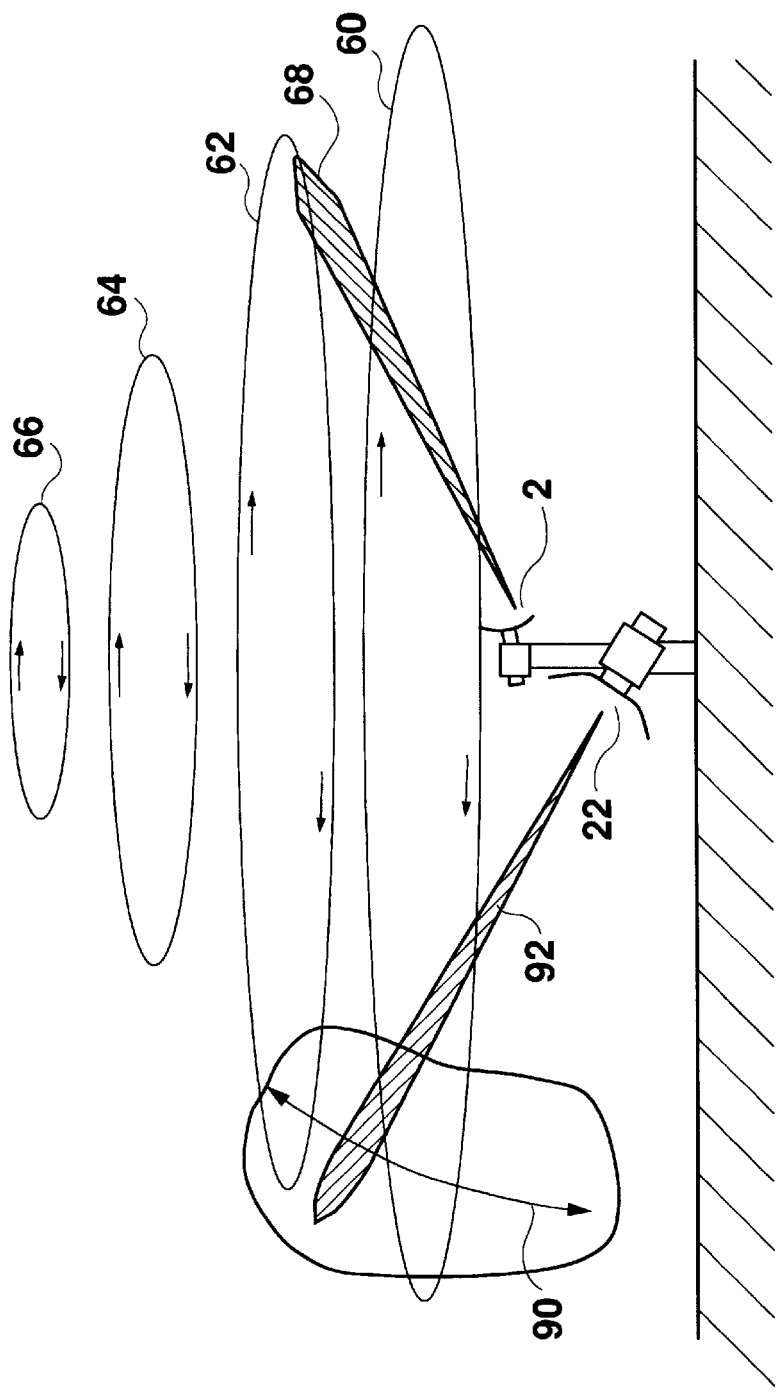
FIG. 3 is a schematic diagram illustrating the scanning operation of a search radar antenna and the scanning operation of an observation radar antenna in the meteorological radar system according to the first embodiment.

Next, the processing operation of the meteorological radar system will be described. FIG. 2 is a flowchart roughly illustrating the operational flow of the meteorological radar system according to the present embodiment. FIG. 3 is a schematic diagram illustrating the scanning of the search radar antenna 2 and the scanning of the observation radar antenna 22. The operational flow contains the loop S50 processed by the search radar section 4, the atmospheric phenomena detecting section 40, and the scanning range deciding section 42 and the loop S52 processed by the observation radar section 24.

The search radar antenna 2 implements CAPPI scanning operation. In the CAPPI scanning operation, for example, the beam 68 is rotationally scanned so as to draw the trails 60 to 66 while the elevation angle thereof is sequentially changed from low angles to high angles. The spherical space with the radar centered can be searched though the CAPPI operation. Even when an atmospheric phenomenon occurs as an object at any position within the radar range, echoes from the object can be captured.

In the search radar section 4, the search radar control section 6 controls the CAPPI scanning operation of the search radar antenna 2 based on the parameters such as predetermined rotation period, the variation of an elevation angle, and the like. Then, data concerning the received signals are captured through the transceiver 8, the signal processing section 10 and the data processing section 12 (S70). The atmospheric phenomena detecting section 40 receives the data to detect the targeted atmospheric phenomenon based on the data (S72). When an atmospheric phenomenon to be observed is detected (S74), the scanning range deciding section 42 receives the location information on the atmospheric phenomenon, that is azimuth and elevation angle. The scanning range deciding section 42 decides the scanning range of the observation radar antenna 22 based on those pieces of information and then stores them into the storage means 76 such as a shared memory, magnetic recording disc, or the like (S78). In this radar system, every time the CAPPI scanning operation is completed for one period (S80), the completion event is reported to the loop S52 on the observation radar section 24 (S82).

The search radar section 4 repeats the CAPPI scanning operation while it properly performs the procedures associated with the CAPPI completion notification or atmospheric phenomena detection in the loop S50.

The observation radar antenna 22 implements, for example, an RHI scanning operation in which the direction of the antenna is vertically changed within predetermined elevation angles. For example, the beam 90 is oscillated along the trail 90 as shown in FIG. 3. The observation radar antenna 22 may be sector-scanned in azimuth within predetermined angles. The observation radar antenna 22 may be two-dimensionally scanned in manner of the sector-scanning whose elevation angle is being sequentially varied within predetermined ranges, or the RHI scanning whose azimuth is being sequentially varied within predetermined ranges. In these scanning operations, one period can be completed in a very short time as compared with the searching of the whole spherical space with the radar system centered. For example, the CAPPI scanning requires five minutes for one period, while RHI scanning requires only about 20 to 30 seconds for one period. That is, the scanning operation of the observation radar antenna 22 is shorter than that of the search radar antenna 2, so that observation can be made with high time resolution.

In the observation radar section 24, the observation radar control section 26 repeats the RHI scanning operation (or the sector scanning operation) of the observation radar antenna 22 based on the scanning range already set (S100). When the search radar section 4 receives notification of one period completion of the CAPPI scanning operation during the repetitive period (S102), it takes the scanning range corresponding to the atmospheric phenomenon detected during one period of the latest CAPPI scanning operation out of the storage means 76 to set the observation radar control section 26 (S104). The observation radar control section 26 continues, for example, the RHI scanning operation of the observation radar antenna 22 using a scanning range updated every one period of the CAPPI scanning operation.

A new scanning range for the atmospheric phenomenon already captured is set so as to shift next to previous scanning ranges. When a new atmospheric phenomenon is found, a new scanning range is set in a direction that may be different from that for the previous scanning ranges.

It is not required that a single observation range be set to the observation radar antenna 24, that is, multiple atmospheric phenomena can simultaneously be observed with high resolution using the observation radar antenna 22. This radar system is characterized in that the observation radar antenna 22 can continue to observe a certain atmospheric phenomenon while the search radar antenna 2 can detect a new atmospheric phenomenon as a possible target. Hence, the storage means 76 can store plural scanning ranges and the observation radar control section 26 can set plural scanning ranges. When plural scanning ranges are set, the observation radar control section 26 sequentially scans them. Setting plural scanning ranges prolongs the time interval for scanning each range, thus sacrificing the time resolution. A preferred approach to avoid such a problem is to set the number of scanning ranges to a predetermined upper limit.

In the meteorological radar system described above, the elevation angle of the search radar antenna 2 is stepwise changed and the data processing section 12 converts the scanning results into data for the CAPPI display. This CAPPI display has the advantage of allowing the operator to easily understand the display result on the display section 14. However, the search radar section 4 is intrinsically required to search for the direction in which an atmospheric phenomenon exists. Hence, the data processing section 12 may have only a simple PPI display function for data to the atmospheric phenomena detecting section 40, but lacks the CAPPI display function.

Moreover, in view of the fact that the search radar section 4 mainly needs to have an atmospheric phenomenon location detecting capability, the search radar antenna 2 may be scanned, for example, in a PPI scanning mode, with no elevation angle changing function, instead of the CAPPI scanning operation.

In the above-mentioned process, the search radar section 4 notifies the observation radar section 24 of the CAPPI scanning operation every period and the observation section 24 implements the scanning range setting and updating process S104 according to contents stored in the storage means 76. However, other aspects are applicable to the timing operations. For example, the observation radar section 24 may implement the setting and updating processes S104 at the timings at which the atmospheric phenomenon detecting section 40 has detected an atmospheric phenomenon.

Embodiment 2

Figure 4:
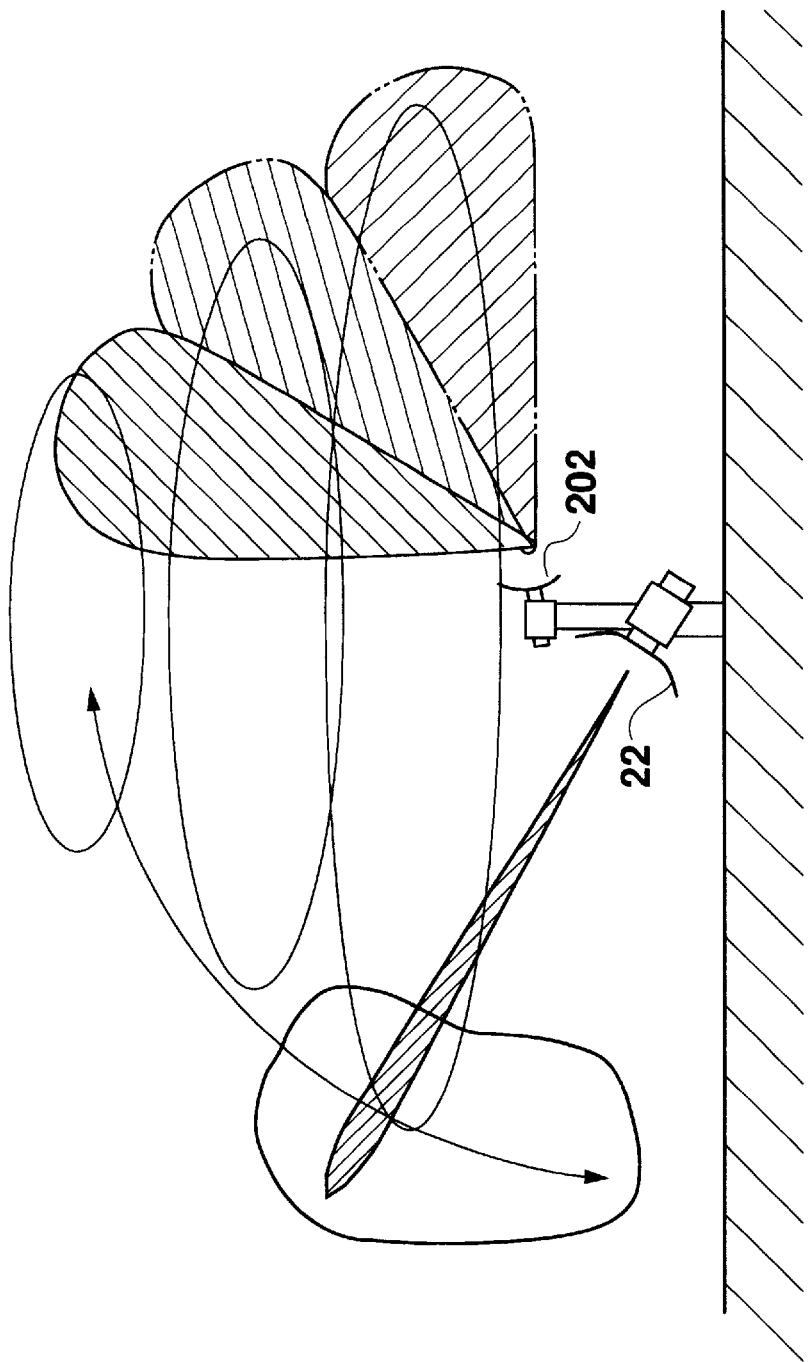
FIG. 4 is a schematic diagram illustrating the scanning operation of a search radar antenna and the scanning operation of an observation radar antenna in the meteorological radar system according to a second embodiment of the present invention.

FIG. 4 is a diagram schematically illustrating the scanning of the search radar antenna 202 and the scanning of the observation radar antenna 22 in the meteorological radar system according to a second embodiment of the present invention. As the configuration of the meteorological radar system is basically similar to that in the first embodiment shown in FIG. 1, duplicate descriptions will not be repeated.

The meteorological radar system of the second embodiment differs from that of the first embodiment in the operation of the search radar antenna. In this embodiment, because high resolution observation is made with the observation radar antenna, a search radar antenna operates by having only a space resolution which can detect for the existence of atmospheric phenomena. Hence, in the second embodiment, the search radar antenna 202 transmits and receive a fan beam with a broader beam width as compared with the search radar antenna 2.

The use of the broader fan beam to search for atmospheric phenomena allows the elevation angle in the CAPPI scanning mode to be changed with a large sweep width, so that a period of the CAPPI scanning mode can be shortened. This feature provides an advantage in that the provability of missing atmospheric phenomena with a short life span can be reduced so that the initial stage of weather phenomena is not overlooked.

Embodiment 3

Figure 5:
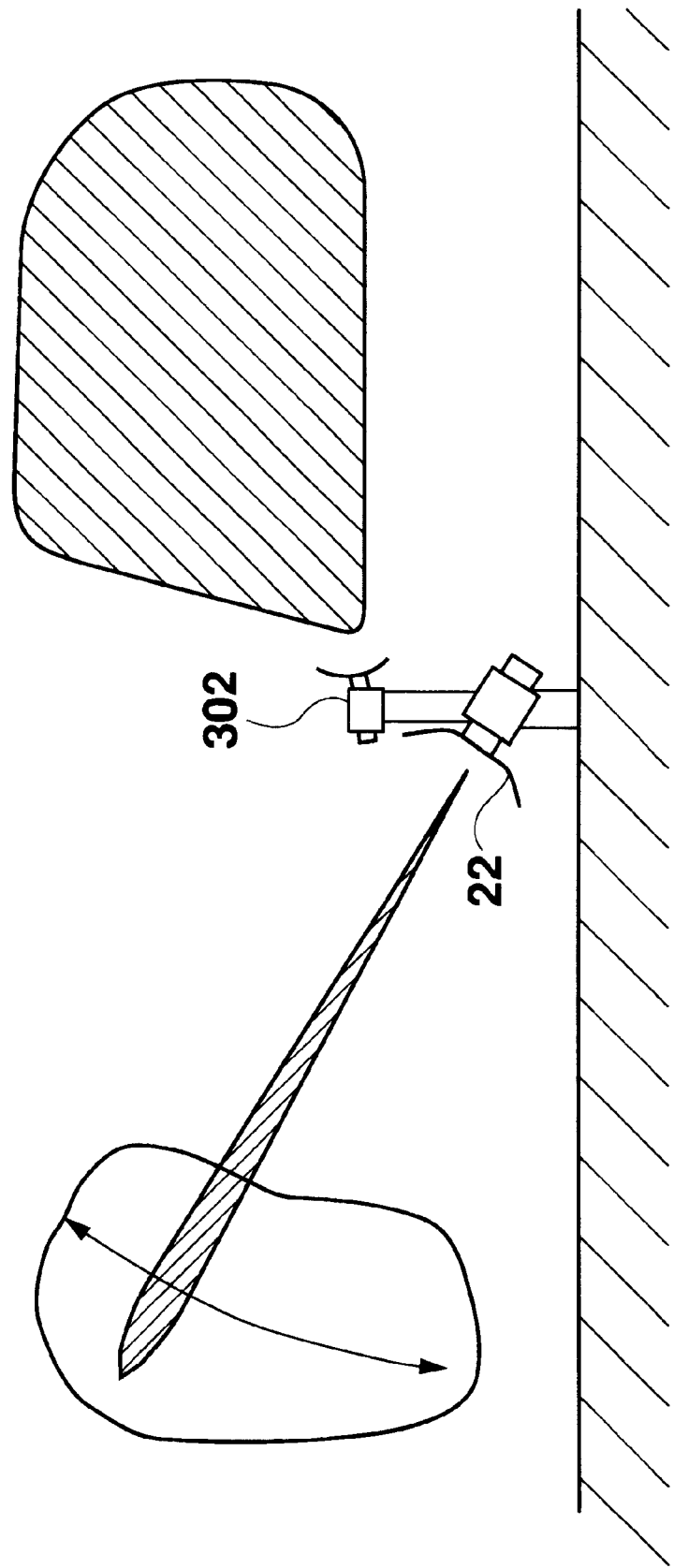
FIG. 5 is a schematic diagram illustrating the scanning operation of a search radar antenna and the scanning operation of an observation radar antenna in the meteorological radar system according to a third embodiment of the present invention.

FIG. 5 is a schematic diagram illustrating the scanning operation of the search radar antenna 302 and the scanning operation of the observation radar antenna 22 scan in the meteorological radar system according to the third embodiment of the present invention. The configuration of meteorological radar system is basically similar to that of the first embodiment shown in FIG. 1. Again, duplicate descriptions will not be repeated.

The meteorological radar system of the third embodiment differs from that of the first embodiment in the method of scanning and driving employed by the search radar antenna. Similar to the search radar antenna 202 of the second embodiment, the search radar antenna 302 transmits and receives a fan beam in a simple PPI scanning operation rather than the CAPPI scanning operation. The search radar control section 6 does not, however, change the elevation angle of the search radar antenna 302.

The period for which the search radar antenna 302 scans can be further shortened by implementing the PPI scanning operation using fan beams. In order to obtain the advantage of the PPI scanning without a decrease in the search efficiency, it is considered that the fan beam width of the search radar antenna 302 is set to a larger value than that of the search radar antenna 202. The beam width of the search radar antenna 302 is ideally 90°. However, the search radar antenna with a beam width of e.g. 70° to 80° can be also practically used for the meteorological radar system in the third embodiment.

Embodiment 4

Figure 6:
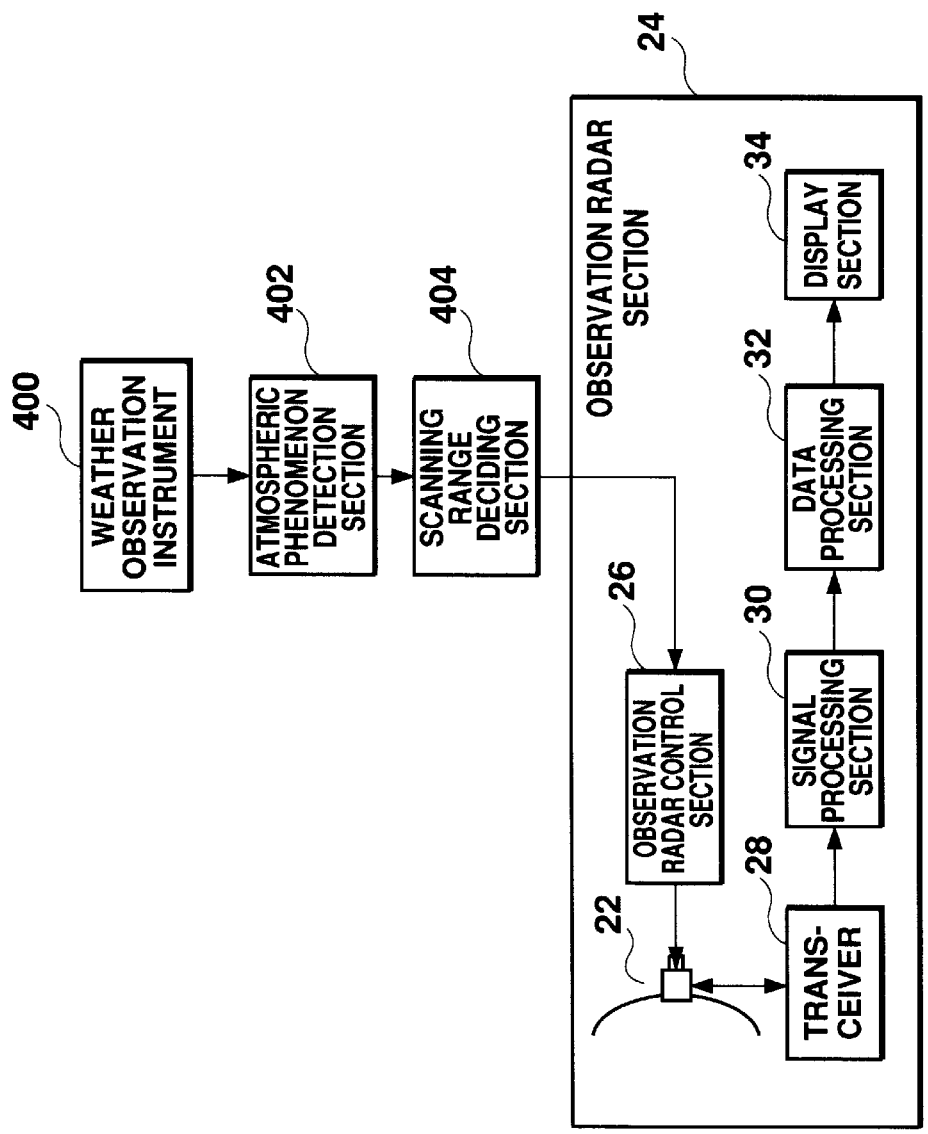
FIG. 6 is a block diagram schematically illustrating a meteorological radar system according to a fourth embodiment of the present invention.

FIG. 6 is a block diagram schematically illustrating a meteorological radar system according to the fourth embodiment of the present invention. Like numerals represent corresponding constituent elements to those of the first embodiment and their description will not be repeated here. In this meteorological radar system, the observation radar antenna 22 is used for high resolution observation of atmospheric phenomena. The configuration of the observation section 24 is identical to that in the first embodiment.

The feature of the meteorological radar system in the fourth embodiment is that atmospheric phenomena are investigated over a wider range using various kinds of data obtained by other weather observation instruments 400 which employ no radar in place of the search radar section 4 of the first embodiment. For example, weather observation instruments 400 located at observation spots collect many pieces of weather data and then send these data to the observation radar section 2 through communication lines.

The atmospheric phenomena detecting section 402 detects an area where an atmospheric phenomenon of interest has occurred or predicts an area where an atmospheric phenomenon will possibly occur based on the collected weather data regarding rainfall, atmosphere pressure, temperature, wind velocity and so on. The scanning range deciding section 404 decides the scanning range to direct the observation radar antenna 22 to the area specified by the atmospheric phenomena detecting section 402. The successive operations or processes in the observation radar antenna 24 are similar to those in the first embodiment and their description will not be duplicated here.

An existing meteorological system may be used as the weather obs evocation instrument 400. In this case, the existing meteorological system is connected to the atmospheric phenomena detecting section 402 in the meteorological radar system. The AMeDAS (Automated Meteorological Data Acquisition System) operated by the Japan Meteorological Agency is one example of an existing system that can be employed as the weather observation system. AMeDAS is a system of concentrating a vast amount of data, such as rain intensity, sent from 1300 unattendant automatic observatories in Japan at predetermined intervals' and transferring there data to the main office of Japan Meteorological Agency and respective weather forecast centers. In the meteorological radar system, observation data down-linked from the geostationary meteorological satellite "HIMAWARI" may be input to the atmospheric phenomena detecting section 402. As described here, the meteorological radar system which has nearly the same advantage as the first embodiment can be simply configured by receiving data from the existing weather observation systems.

The system of the first embodiment could detect the size (scale) of an observed object and then decide the scanning range at angles in the azimuth and at an elevation angle in altitude according to the detected value. However, in this embodiment, it is difficult to obtain information regarding the vertical direction with respect to an observed object. For that reason, in the scanning range of the observation radar in the meteorological radar system, only an azimuth angle is decided based on information from the atmospheric phenomena detecting section 402 while the scanning range at an elevation angle is set according to the kind of observed object. Since a target such as fog occurs only at low altitudes, the observation radar antenna scans beams up to about 45°. Since a target such as a thundercloud may exists over a broader area including very high altitudes, the observation radar antenna scans beams up to about 90°.

Embodiment 5

Figure 7:
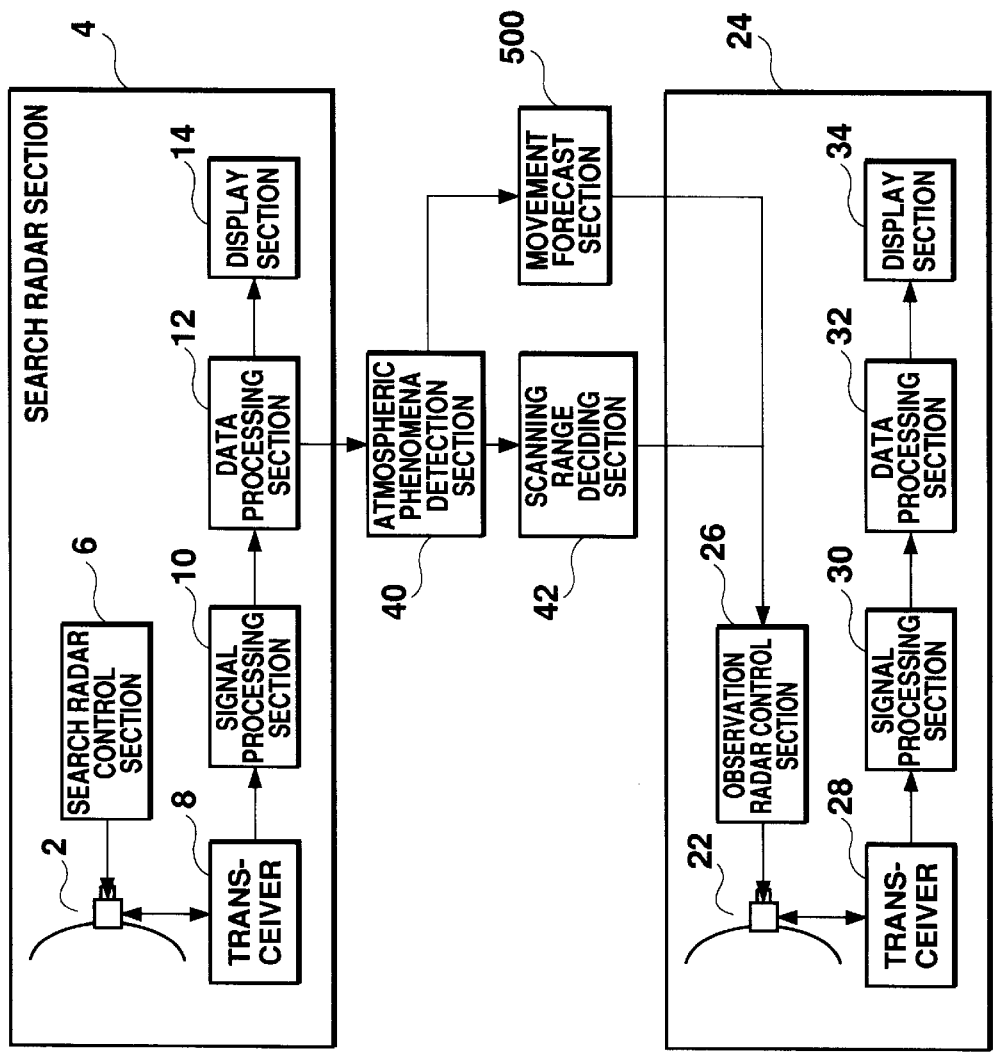
FIG. 7 is a block diagram schematically illustrating a meteorological radar system according to a fifth embodiment of the present invention.

FIG. 7 is a block diagram schematically illustrating a meteorological radar system according to a fifth embodiment of the present invention. In FIG. 7, like numerals represent the same constituent elements as those in the first embodiment. Hence, the duplicate description will be omitted here. The meteorological radar system of the present embodiment is characterized by the movement forecasting section 500.

The search radar section 4 generally detects for the same target once during one period of the CAPPI scanning operation. The scanning period is, for example, in the order of several minutes. When an target is moving swiftly, it may leave the prescribed scanning range of the observation radar antenna 22 during one scanning period. In such a case, the target can be observed with good time resolution and high space resolution while the atmospheric phenomenon object is correctly tracked within the scanning range, like the first embodiment. However, when the atmospheric phenomenon object leaves the scanning range, it cannot be observed until the next searching and capturing operation of the search radar section 4. The present meteorological radar system is constructed to solve such problems. Based on the location of an observed object captured in past by the search radar section 4, the movement forecasting section 500 predicts the future location of the object where the object is to be captured in the next CAPPI scanning operation. For example, the movement forecasting section 500 extrapolates two latest locations of the object captured by the search radar section 4 and then predicts the new location. In this case, the extrapolation may be performed based on high-order functions using data on more past locations, rather than data on two past locations.

Figure 8:
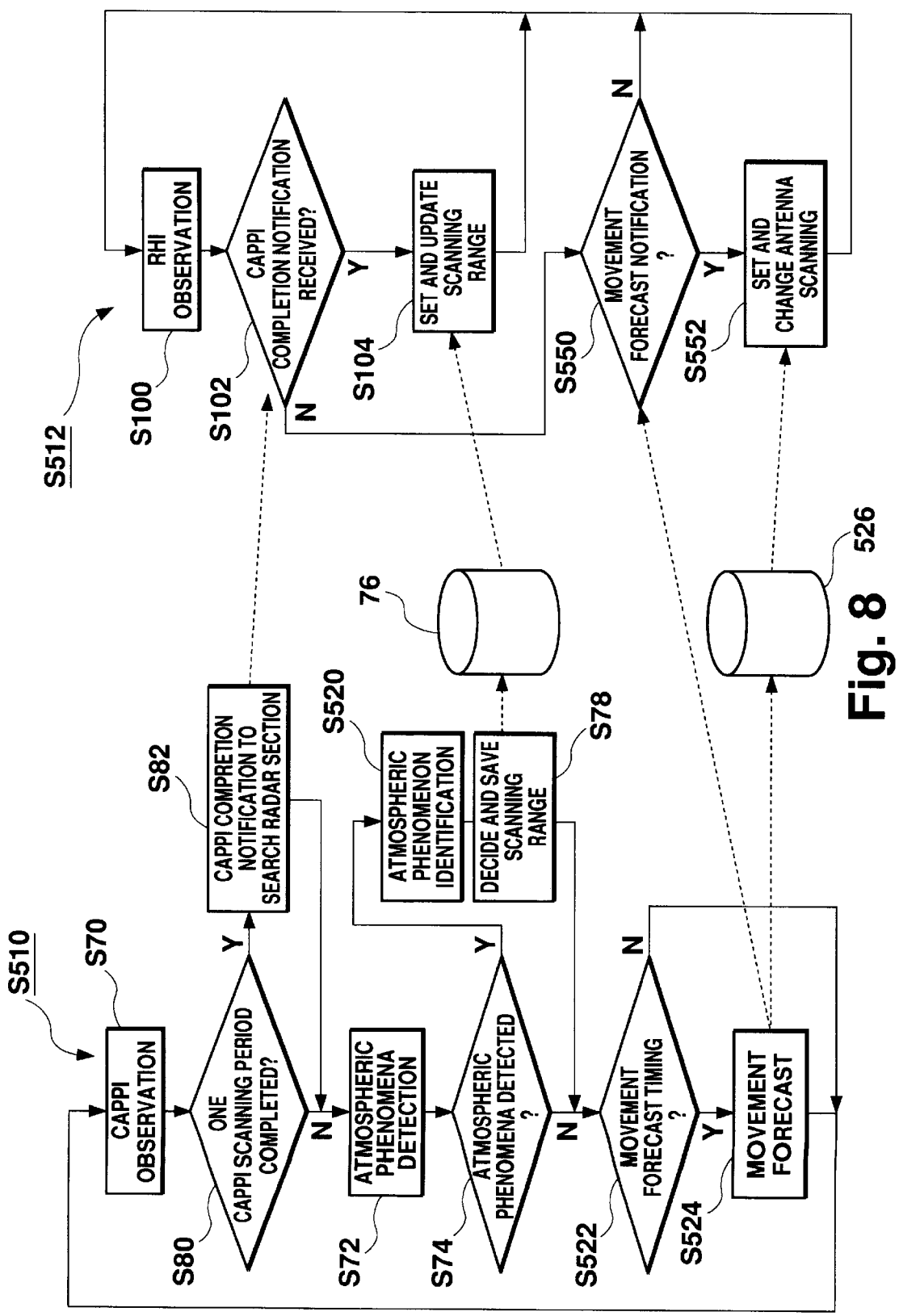
FIG. 8 is a flowchart roughly showing the process flow in the meteorological radar system according to the fifth embodiment.

FIG. 8 is a flowchart schematically illustrating the operational flow of the meteorological radar system of the present embodiment. The operation and function of the meteorological radar system will be described with reference to FIG. 8. The explanation will be simplified here by providing like numerals to the same flows as those in FIG. 2. The loop S510 is processed by the search radar section 4, the atmospheric phenomena detecting section 40, the scanning range deciding section 42, and the movement forecasting section 500. The loop S512 is processed by the observation radar section 24.

Steps S70 to S82 are similar to steps of the first embodiment. After the CAPPI completion notification to the observation radar section 24 and the step S520 of identifying atmospheric phenomena (to be described later), the scanning range is decided every period of the CAPPI scanning operation. The resultant scanning range is stored in the storage means 76.

In the meteorological radar system, the timing for movement prediction is provided with the timing of interpolating the period of the CAPPI scanning operation. It is now assumed that the timing at which the n-th period of the CAPPI scanning operation has completed is represented as $T=T(n)$, that T is the period of the CAPPI scanning operation and that the timing for movement prediction is provided by dividing $T (=T(n)~T(n+1))$ by k. In this case, $(k-1)$ movement prediction timings, for example, are set for the duration $T (=T(n)~T(n+1))$. Where the time is represented by $t(n,1)$ ~$t(n, k-1)$, the formula $t(n,m)=(T(n)+m\tau/k)$ is held. The movement forecasting section 500 includes time measuring means. When the time measuring means detects the time T is $t(n,m)$ (S522), the movement forecasting section 500 performs the movement prediction process S524. The movement prediction process can be performed, for example, by performing past two CAPPI scanning operations, that is, operations during the (n−2) period and the (n−1) period and then using the detection times $T_{OBJ}(n-2)$ and $T_{OBJ}(n-1)$ of the same atmospheric phenomenon as well as the locations $P(n-2)$ and $P(n-1)$ thereof at each detection time. The forecast location $p(n,m)$ is linearly interpolated and then expressed by the following formula.

$$p(n,m)=P(n-1)+\{P(n-1)-P(n-2)\}\cdot\{t(n,m)-T_{OBJ}(n-1)\}/\{T_{OBJ}(n-1)-T_{OBJ}(n-2)\} \quad (1)$$

The forecast result is stored into the memory means 526. The completion of the movement prediction is reported to the loop S512 in the observation radar section 24 (S524). The forecast result stored into the storage means 526 relates to, for example, the center position (in azimuth and elevation angle) of an atmospheric phenomenon. In a simple method, the size of the scanning range is not changed so that only the scanning range of the same size can be shifted to the position obtained as a forecast result. Needless to say, as for position prediction, the scanning range can also be found by extrapolation and estimation.

In the present meteorological radar system, when plural atmospheric phenomena are detected or clutters exist, it is needed to identify them for movement prediction. In other words, the positions P(n−2) and P(n−1) in formula (1) must be expressed as positions of the same atmospheric phenomenon at different points in time. An identification process for that case is performed in the atmospheric phenomena identifying step S520. In the identifying step S520, it is identified that an atmospheric phenomenon detected in the CAPPI scanning operation during the n-th period corresponds to the atmospheric phenomenon already detected during the (n−1) period or a newly detected atmospheric phenomenon. If a detected atmospheric phenomenon is an atmospheric phenomenon that has already been detected, it is judged that the position of the detected atmospheric phenomenon corresponds to any one of positions obtained in past. The result is added to each atmospheric phenomena in the form of, for example, an atmospheric phenomena identification number. Chronological changes in positions of the same atmospheric phenomenon can be managed with the identification number.

As is possible with the movement prediction, plural atmospheric phenomena, for example, can be identified using the past positions P(n−2) and P(n−1). Simply, if a measured position P(n) of an atmospheric phenomenon is closer to the position P'(n) found by extrapolation of past positions P(n−2) and P(n−1) of the atmospheric phenomenon whose identification number is j, rather than the measured positions of other atmospheric phenomena whose identification number is not j, it is judged that the moved atmospheric phenomenon corresponds to the atmospheric phenomenon with the identification number j. When the position P(n) is separated from the position P'(n) a predetermined reference value or more, it is judged that the atmospheric phenomenon is one newly detected. For identification, the same identification number is added to the movement forecast value to be stored into the storage means 526.

The steps S100 to S104 in the loop S512 of the observation radar section 24 for the most part correspond to those in the first embodiment. Upon receiving the scanning completion notification every period of the CAPPI scanning operation, the observation radar control section 26 updates the setting of the scanning range. In the judgment step S102, when the completion notification of a CAPPI scanning operation has not been received, the flow is immediately branched to the step of securing the presence or absence of movement forecast notification (S550), without returning to the step S100. When there is no movement notification in the step S550, the process goes back to the step S100. However, when a movement forecast notification is received through the loop S510, the setting of the observation radar control section 26 is changed by reading a movement forecast result stored in the storage means 526 (S552). Thereafter, the process returns to the step S100.

The meteorological radar system with the above-mentioned configuration can continuously observe an atmospheric phenomenon as a target, without overlooking, even when the target moves at a high velocity.

Embodiment 6

Figure 9:
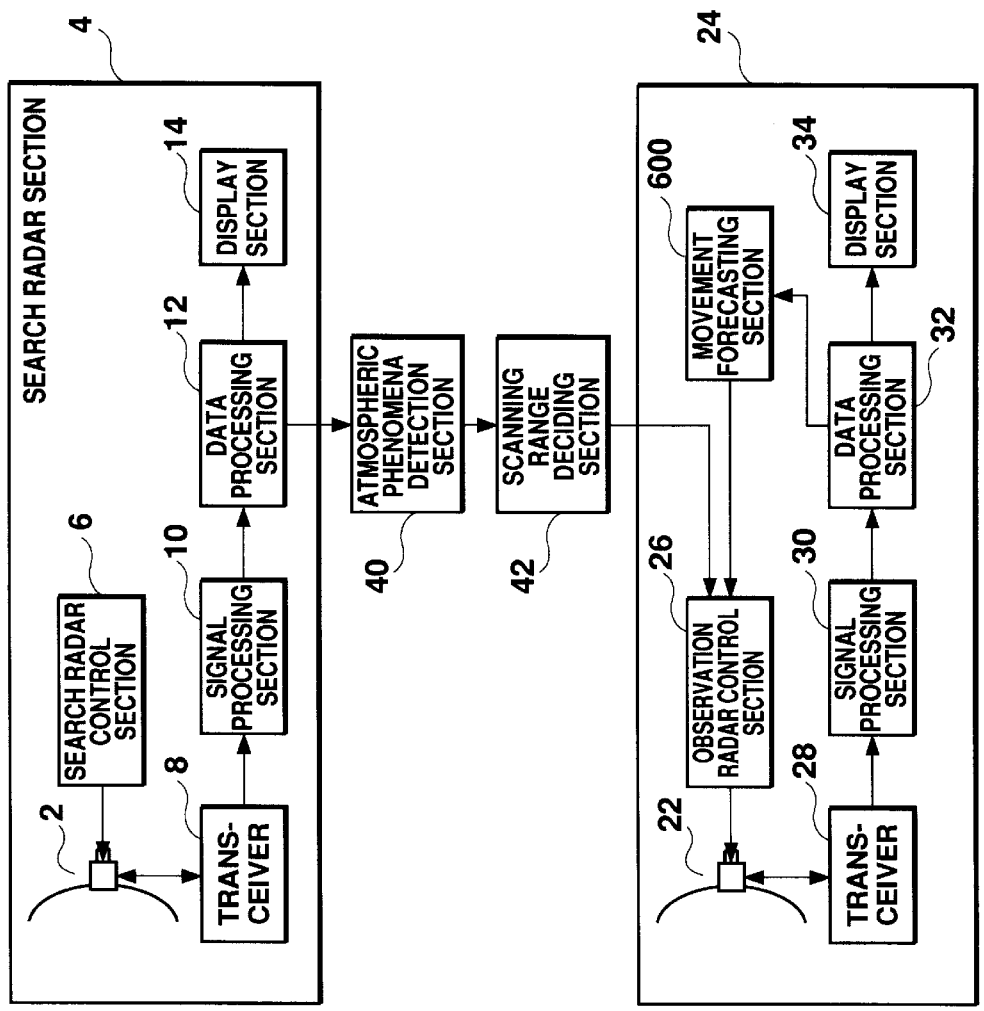
FIG. 9 is a block diagram schematically illustrating a meteorological radar system according to a sixth embodiment of the present invention.

FIG. 9 is a block diagram schematically illustrating a meteorological radar system according to a sixth embodiment of the present invention. Referring to FIG. 9, like numerals represent the same constituent elements as those in the first embodiment and their description will not be repeated here. The meteorological radar system is characterized by the movement forecast section 600, and the observation radar control section 26 two-dimensionally moves the observation radar antenna 22, with the RHI scanning operation and the sector scanning operation combined, so that the tracking performance of atmospheric phenomena can be improved.

The movement forecasting section 600 forecasts and estimates a future location of an object until the object will be captured in the next CAPPI scanning operation. This forecasting is made with the observed data obtained by the observation radar section 24. A combination of the RHI scanning operation and the sector scanning operation corresponds to a scanning operation of vertically scanning while the azimuth angle is sequentially changed in the RHI scanning operation or a scanning operation of horizontally scanning while the elevation angle is sequentially changed in the sector scanning operation. The observation radar section 24 can get a two-dimensional echo image of an atmospheric phenomenon as an observed target by the combined scanning method.

The movement forecast section 600 captures echo data for an observed object from the data processing section 32. The movement forecast section 600, for example, forecasts and estimates the destination of a target by detecting movement of the location of a two-dimensional echo image of a target captured within a scanning range based on data on the echo image and then extrapolating the moving vector. For example, the moving vector can be obtained by calculating the center of an echo image and then detecting the displacement. Based on the forecast result from the movement forecast section 600, the observation radar control section 26 adjusts the direction of the observation radar antenna 22, thus tracking the observed target. It is not a matter whether the movement forecast section 600 is built into or out side of the observation radar section 24.

Figure 10:
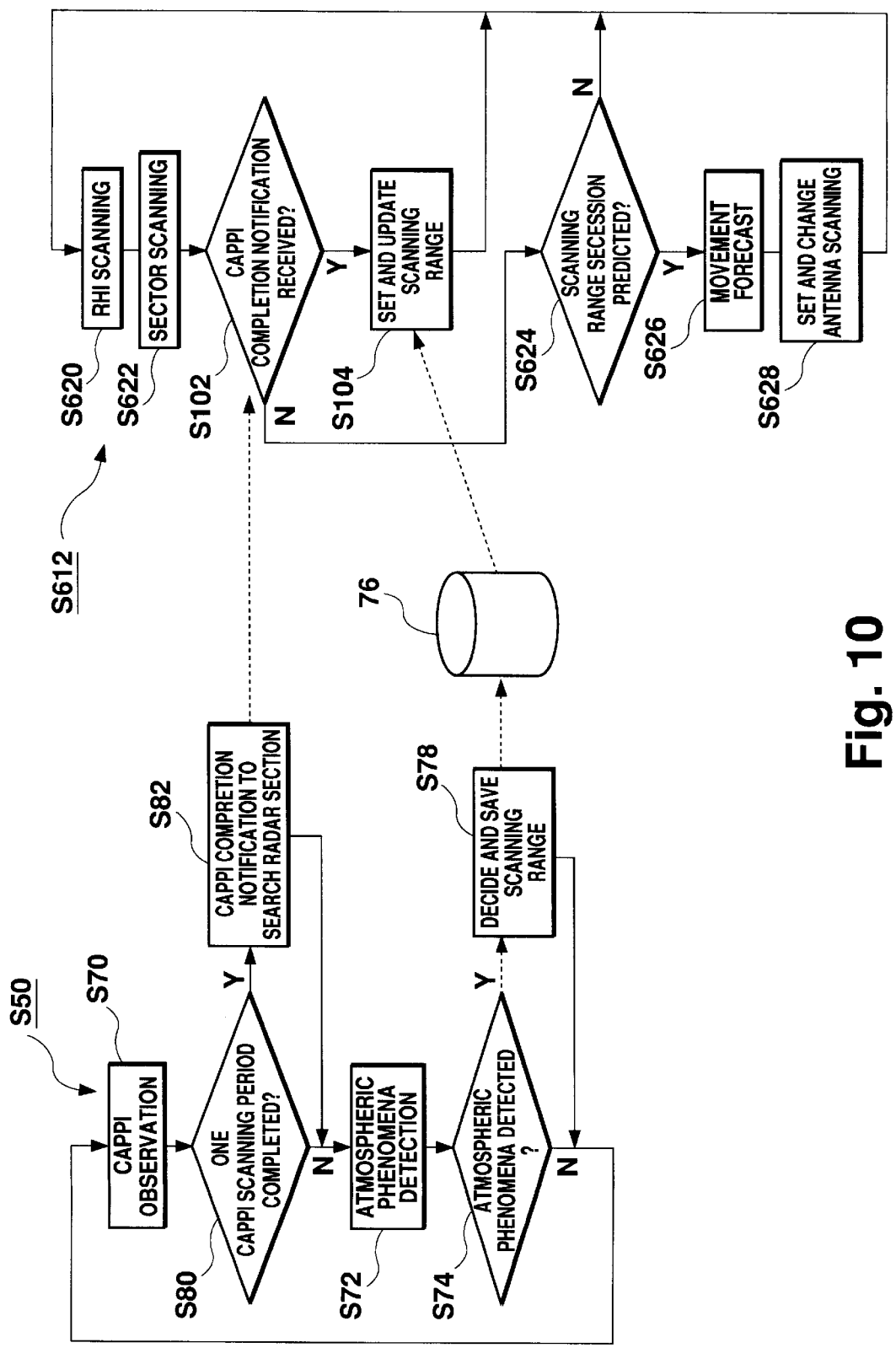
FIG. 10 is a flowchart roughly showing the process flow in the meteorological radar system according to the sixth embodiment.

FIG. 10 is a flowchart schematically illustrating the operational flow of the meteorological radar system. The operation and function of the meteorological radar system will be described here with reference to FIG. 10. In order to simply explain the operational flow shown in FIG. 10, like numerals are attached to the same steps as those in FIG. 2. The loop S50 similar to that in the first embodiment is processed by the search radar section 4, the atmospheric phenomena detecting section 40, and the scanning range deciding section 42. The loop S612 is processed by the observation radar section 24.

In the loop S612 being the feature of the meteorological radar system of the present embodiment, the observation radar control section 26 implements the RHI scanning operation (S620) and the sector scanning operation (S662) under a predetermined condition such as scanning range. In the steps S620 and S622, the RHI scanning operation as described above is repeated by vertically scanning an antenna at an azimuth angle and then scanning it at a different azimuth angle (sector scanning).

When the two-dimensional scanning operation has been completed once, the observation radar section 24 checks for the presence or absence of the CAPPI scanning completion notification from the loop S50. If notification is detected (S102), the setting (such as scanning range) of the observation radar control section 26 is updated based on the observation result by the CAPPI scanning operation stored in the storage means 76 (S104). Then, the process returns to the steps S620 and S622. When it is judged that no CAPPI scanning completion notification has been received, the process branches to the judgment process S624, not immediately returning to the step S100. In the step S624, it is judged whether the echo image of an observed object captured within the scanning range of the observation radar antenna 22 is being deviated from the scanning range. The judgment, for example, is made based on the fact that the distance between the center of the echo image and the fringe of the scanning range becomes less than a predetermined value. When it is judged that there is a possibility for deviation, a movement forecasting and estimating process is performed (S626). The observation radar control section 26 is set to the observed object location forecast or estimated in step S626 to change and adjust the direction of the observation radar antenna 22 based on the set value (S628). Thereafter, the process goes back to step S620.

The meteorological radar system with the above-mentioned configuration can track an atmospheric phenomenon as a target of a fast moving velocity, so that observation can be continued without missing it.

Embodiment 7

Figure 11:
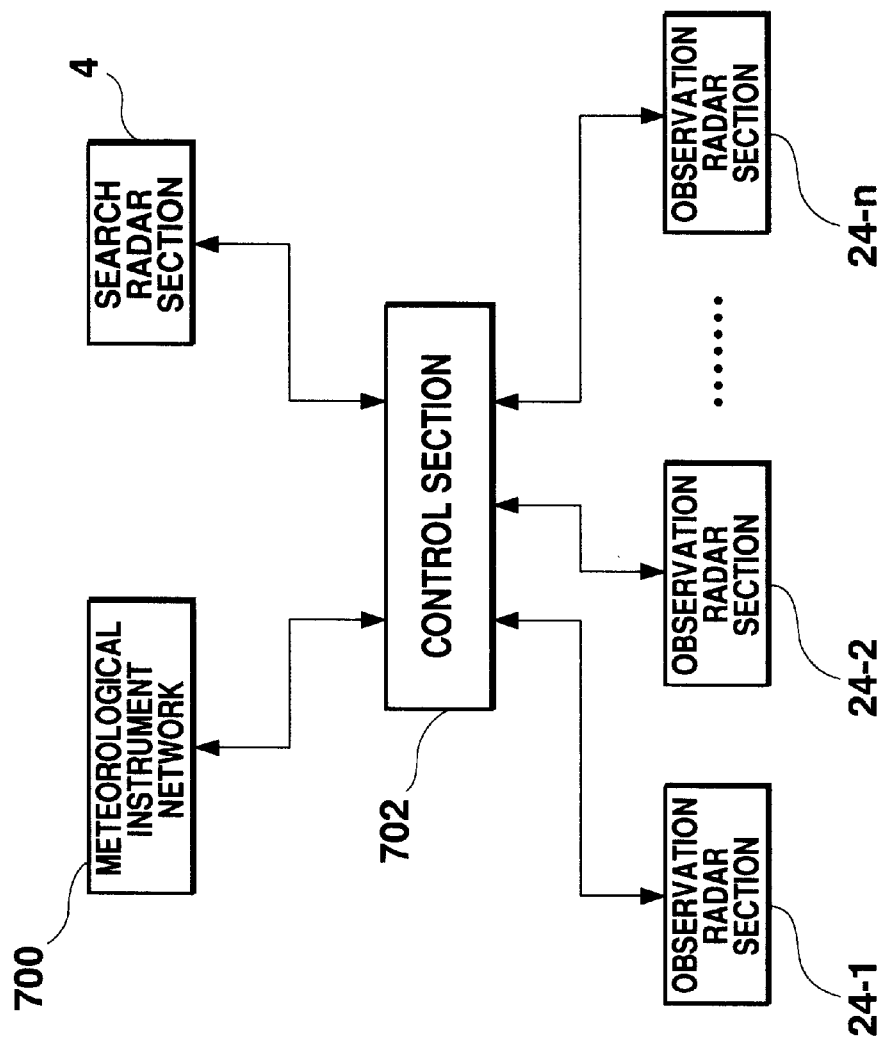
FIG. 11 is a block diagram schematically illustrating a meteorological radar system according to a seventh embodiment of the present invention.

In the following figures, like numerals represents the same constituent elements as those already described for the first embodiment and their description will not be duplicated here. FIG. 11 is a block diagram schematically illustrating a meteorological radar system according to the seventh embodiment. The meteorological radar system is characterized in that a control section centrally manages and controls plural observation radar sections 24 which respectively located at different spots and the search radar section 4. The control section receives observation data respectively captured by the observation radar sections 24-1 to 24-n and the search radar section 4, and the meteorological instrument network 700. The control section 702 sends various kinds of information to the observation radar sections 24-1 to 24-n to control radar antennas.

Figure 12:
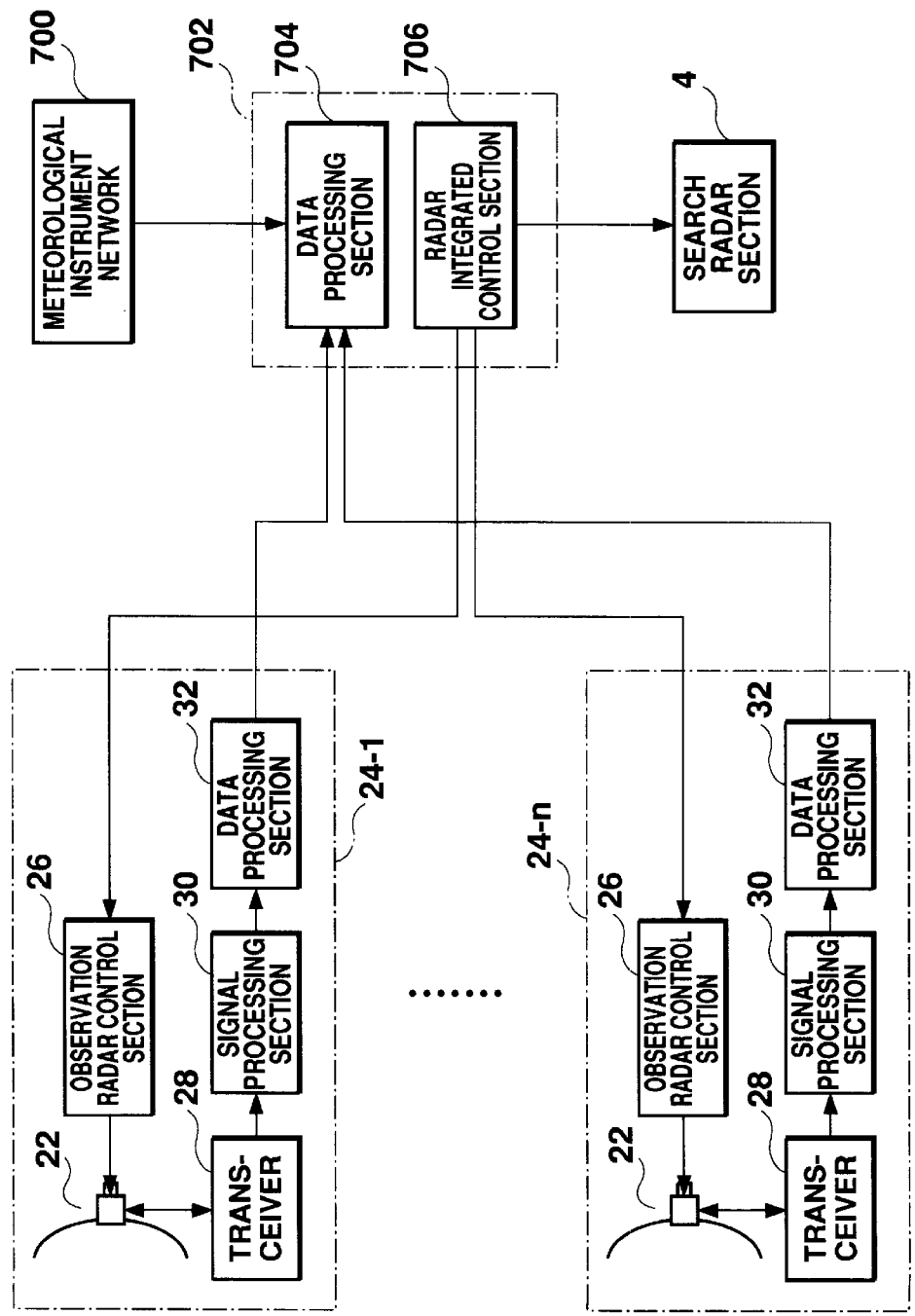
FIG. 12 is a block diagram illustrating in more detail the meteorological radar system according to the seventh embodiment of the present invention.

FIG. 12 is a block diagram illustrating the detail configuration of the meteorological radar system. Each of the observation radar sections 24-1 to 24-n is basically identical to that in the first embodiment. Each observation radar section consists of an observation radar antenna 22, an observation radar control section 26, an transceiver 28, an signal processing section 30, and a data processing section 32. Since each observation radar section is controlled by the remote control section 702, it do not necessarily need the display section 34. The control section 702 consists of the data processing section 704 and the radar integrated control section 706. The data processing section 704 performs a batch processing by collecting observation data from each of the observation radar sections 24-1 to 24-n, observation data from the search radar section 4, and observation data from the meteorological instrument network 700 via communication lines. The radar integrated control section 706 controls the observation radar antennas 22 and the search radar antenna 2 based on the result processed in the data processing section 704. In other words, the radar integrated control section 706 controls the scanning of the observation radar control section 26 which scans and drives each observation radar antenna 22 and search radar control section 6 which scans and drives the observation radar antenna 2 to change parameters such as scanning ranges.

Figure 13:
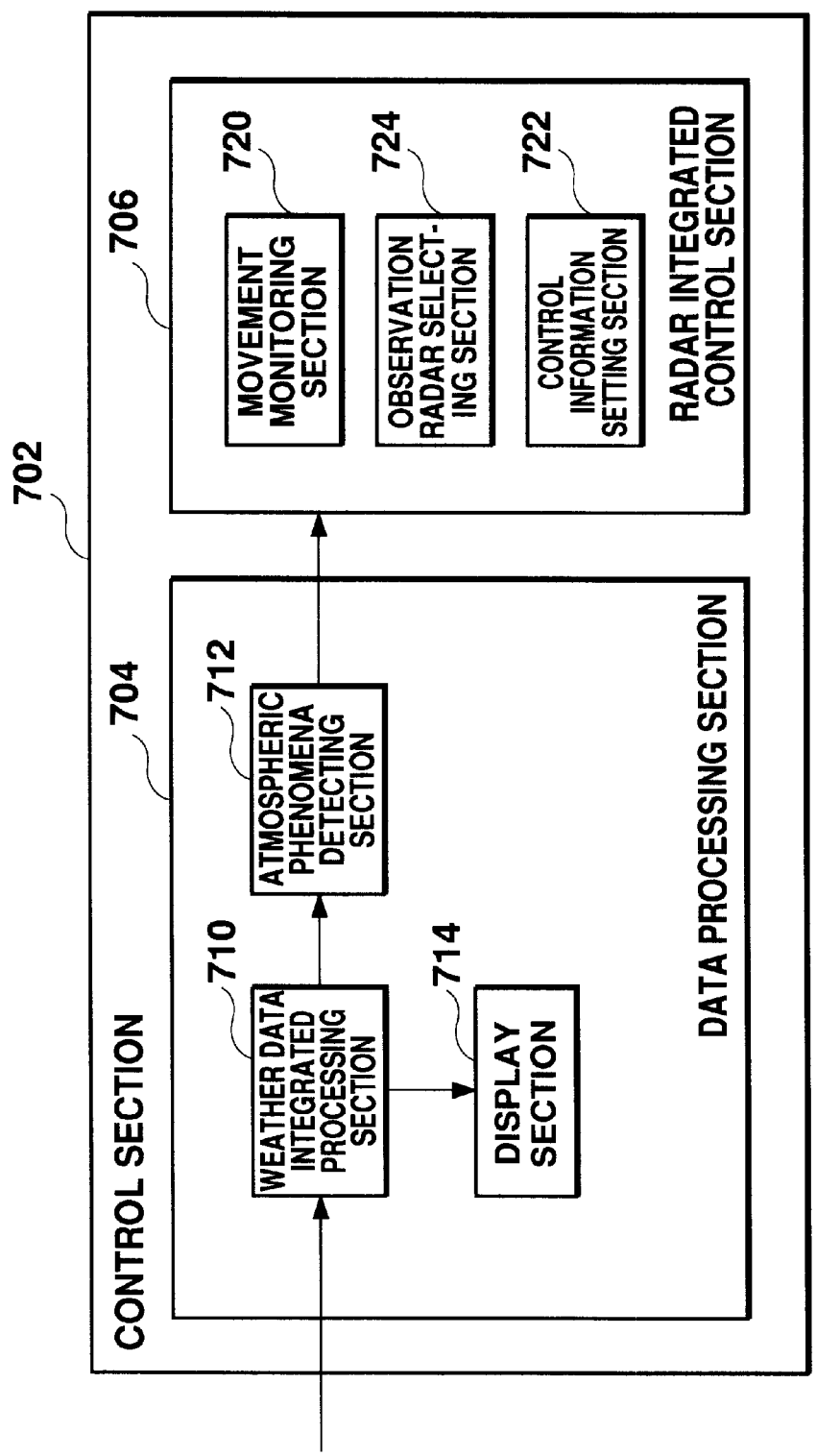
FIG. 13 is a block diagram schematically illustrating the detailed configuration of the control section according to the seventh embodiment of the present invention.

FIG. 13 is a block diagram illustrating the detailed configuration of the control section 702. The data processing section 704 consists of the weather data integrated processing section 710 for integrally processing atmospheric data from the observation radar section 24 or the like, the atmospheric phenomena detecting section 712 for detecting an atmospheric phenomenon from observed data obtained by the observation radar sections 24-1 to 24-n, and the display section 714 for indicating data and the analysis result to an operator. The radar integrated control section 706 consists of the operation monitoring section 720 for monitoring the operation of each of the observation radar sections 24-1 to 24-n located at various places, the control information setting section 722 for setting scanning ranges and observation parameters to the observation radar control section in each observation radar section and the search radar section 6 in the search radar section 4, and the observation radar selecting section 724 for selecting an observation radar section to be used to observe a detected object phenomenon among plural observation radar sections.

Next, the operation and process of the meteorological radar system will be described below.

The search radar section 4 operates at all times. Weather observation data captured by the search radar section 4 is input to the data processing section 704 in the control section 702 and then are transmitted to the atmospheric phenomena detecting section 712 via the weather data integrated processing section 710. The atmospheric phenomena detecting section 712 detects an atmospheric phenomenon as an observed object from the data obtained by the search radar antenna 4 and then outputs information regarding the position and size thereof to the radar integrated control section 706. In this atmospheric phenomena detecting process, data regarding temperatures, atmospheric pressure and so on obtained by the meteorological instrument network may be utilized along with the information on atmospheric phenomena. The meteorological instrument network 700 may, for example, consist of observation instruments located at many remote places in the AMeDAS (described in the fourth embodiment). Moreover, the detecting process allows an observed object to be tracked with more accurate observation information, that is, observation data from the observation radar sections 24-1 to 24-n integrally processed in the weather data integrated control section 710.

In the data processing section 704, the display section 714 displays data regarding the tracking condition of atmospheric phenomena which can be checked by an observer. Thus, the observer can recognize many data observed by a plurality of different observation radar sections as integrated data.

In the radar integrated control section 706, the observation radar selecting section 724 selects one or more observation radar sections suitable for high-resolution observation of a detected atmospheric phenomenon among observation radar sections 24-1 to 24-n located at remote places. This selection is made, for example, on the basis of the location information and map information on each observation radar section provided in advance and on the location and size of a target sent from the data processing section 704. The radiated beams of a radar diverge as going away from the radar antenna so that the space resolution in the cross range direction is deteriorated. For example, an object can be observed with higher space resolution by selecting an observation radar section near to it. An atmospheric phenomenon can be observed from different angles by selecting plural observation radar section 24 located so as to surround a target.

Based on the relative position between a target and a selected observation radar section and the size of the target, the control information setting section 722 decides the scanning range of the selected observation radar section and other observation dimensions and then provides this information to the selected observation radar section.

The search radar section 4 observes weather conditions within the observation range thereof every predetermined period. According to data periodically obtained by the search radar section 4, both the observation radar selecting section 724 and the control information setting section 722 judge whether or not the current selected observation radar section is to be changed or to be continuously used without shifting, or change and update the setting of the scanning range of each observation radar section. The control section 702 can realize high resolution observation by selecting observation radar sections 24 according to, for example, plural atmospheric phenomena captured by the search radar sections 4 during one period, and thus allotting the observation of the atmospheric phenomena to the selected observation radar sections 24.

Figure 14:
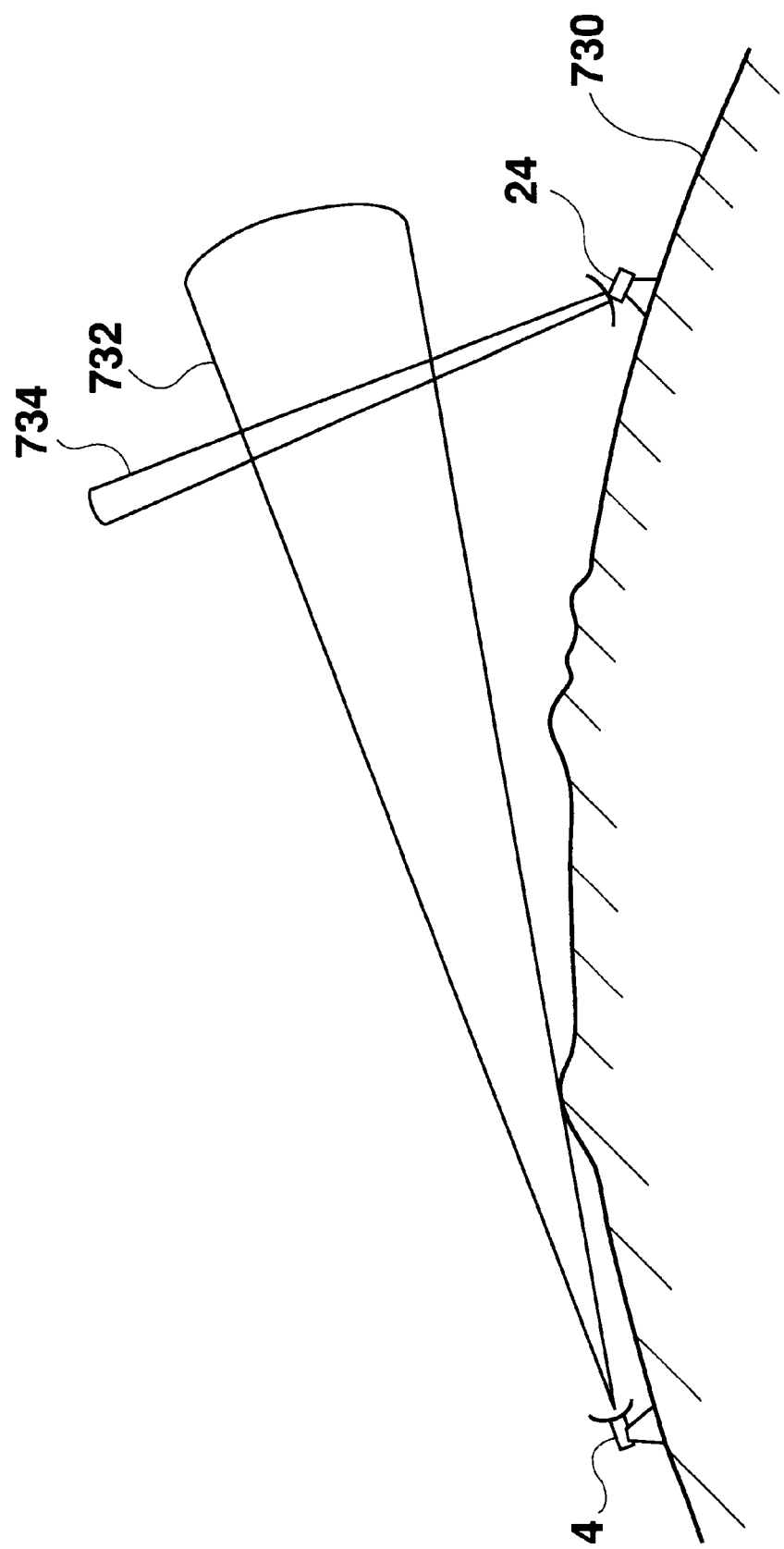
FIG. 14 is a schematic diagram illustrating how to use the meteorological radar system according to the seventh embodiment.

FIG. 14 is a schematic diagram illustrating how the meteorological radar system of the present embodiment may be used. FIG. 14 shows beams on the geometric plane perpendicular to the ground surface. Search radar 4 which uses, for example, a radio wavelength in the C-band has a wide search range of a radius of about 200 km and can search for atmospheric phenomena produced or passing within this range. In such a large observation range, the effects caused by the curvature of the ground surface 730, obstacles such as mountains, buildings, and so on within the range cannot be ignored. That is, since the radar beam 732 passes over the ground far into the distance, the search radar section 4 may not observe atmospheric phenomena at low altitude in such areas. Moreover, another problem is that beams diverging in the distance decrease the space resolution. However, according to the meteorological radar system of the present embodiment, a nearby observation radar section 24 is selected for the atmospheric phenomena distant from the search radar section 4, thus enabling high resolution observation. The observation radar sections are distributed in many places and can observe the areas mutually covered according to the installation distance. The observation radar can use, for example, the wavelength range in the X or Ka band which provides a range shorter than that for the search radar section 4 which allows radio waves with shorter wavelengths to be used. Although this results in a shorter search range, the beam width of the beam 734 is narrowed, which improves the space resolution. As described now, according to the meteorological radar system, the search radar section 4 searches for an atmospheric phenomenon and the observation radar section 24 subjects the detected phenomenon to a high resolution observation.

Figure 15:
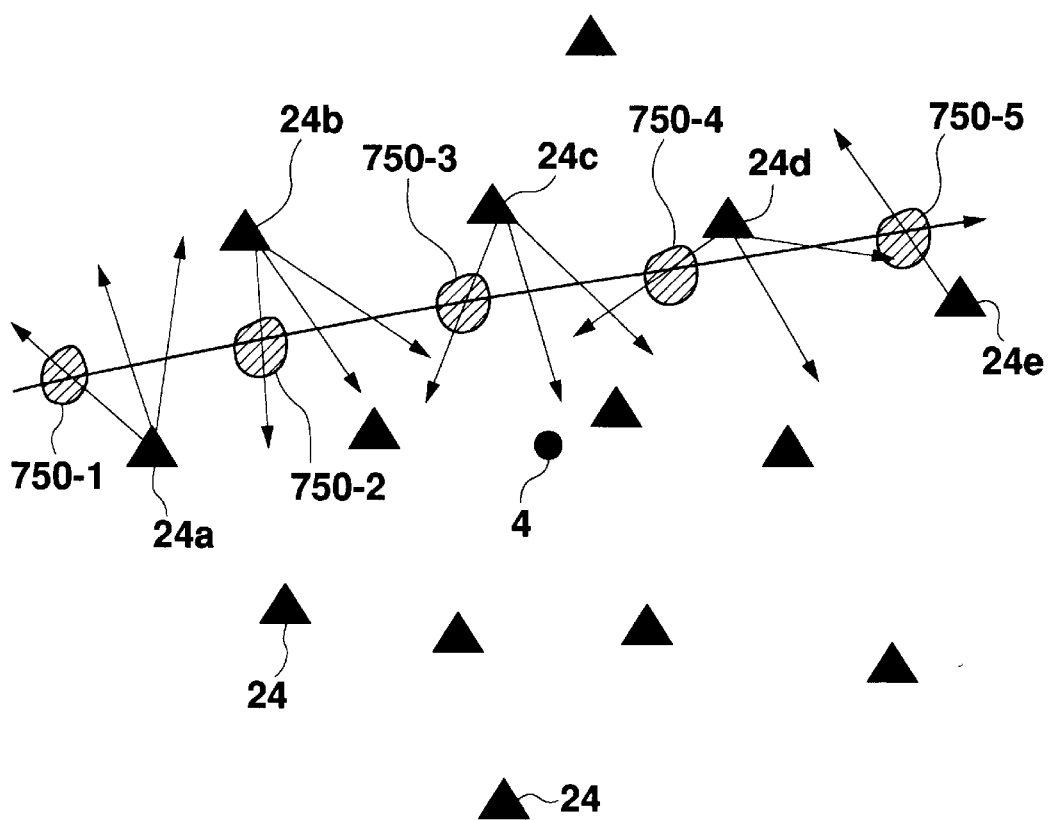
FIG. 15 is a plan diagram schematically illustrating the positioning of search radar section and observation radar sections in the meteorological radar system according to the seventh embodiment.

FIG. 15 is a plan view schematically illustrating the distribution of the search radar section 4 and the observation radar sections 24 in the meteorological radar system. The black circle represents the location of the search radar section 4. Triangles represent the locations of the observation radar sections 24. In the meteorological radar system shown in FIG. 15, plural observation radar sections 24 are distributed according to the coverage of the search radar section 4.

When the atmospheric phenomena detecting section 712 in the search radar section 4 detects an atmospheric phenomena 750-1 to 750-5 moving within the search range, the observation radar selecting section 724 selects, for example, nearby observation radar sections 24a to 24e. The control information setting section 722 decides the azimuth and the scanning range of the observation radar section 24 in order that the observation radar section 24 can observe the atmospheric phenomena. The decided scanning range is transmitted and set to the observation radar section 24. When the search radar section 4 detects the atmospheric phenomenon 750-1 at the time $T_{OBJ}(n)$, the observation radar section 24a, for example, is selected for high resolution observation. When the atmospheric phenomenon is at the location 750-2 at the time $T_{OBJ}(n+1)$, the search radar section 4 detects it and selects the observation radar section 24b corresponding to the location 750-2 for high resolution observation. This operation is repeated until the atmospheric phenomenon passes through out of the scanning range of the search radar section 4. During the search radar section 4 tracks the atmospheric phenomenon, the search radar section 4 predicts the movement of the atmospheric phenomenon and then notifies the selected observation radar section 24 of the predicted result. The observation radar section 24 tracks the atmospheric phenomenon based on the predicted result. In this example, plural observation radar sections 24 may be selected to observe the atmospheric phenomenon with high resolution at the same time.

Only one search radar section 4 is shown in FIG. 15. However, plural search radar sections 4 may be distributed at different places. In this case, the control section 702 integrally controls the plural search radar sections 4.

In the above-described configuration, when plural observation radar sections 24 observe weather conditions over a relatively wide range, the weather conditions can be effectively and accurately measured by controlling the operation of each of the observation radar sections 24 based on the information from the search radar section 4.

As in fifth embodiment, the control section 702 may include a movement forecast section that predicts the movement of an target atmospheric phenomenon based on current and past data from each of the observation radar sections 24. Thus, the movement forecast section can predict the coverage of the next observation radar section into which the target currently captured in the coverage of an observation radar section will move in the future.

As in sixth embodiment, each observation radar section 24 may include a movement forecast section and may predict movement of a target based on observation data obtained by the observation radar section 24 itself to vary the scanning range of the observation radar section 24.

Figure 16:
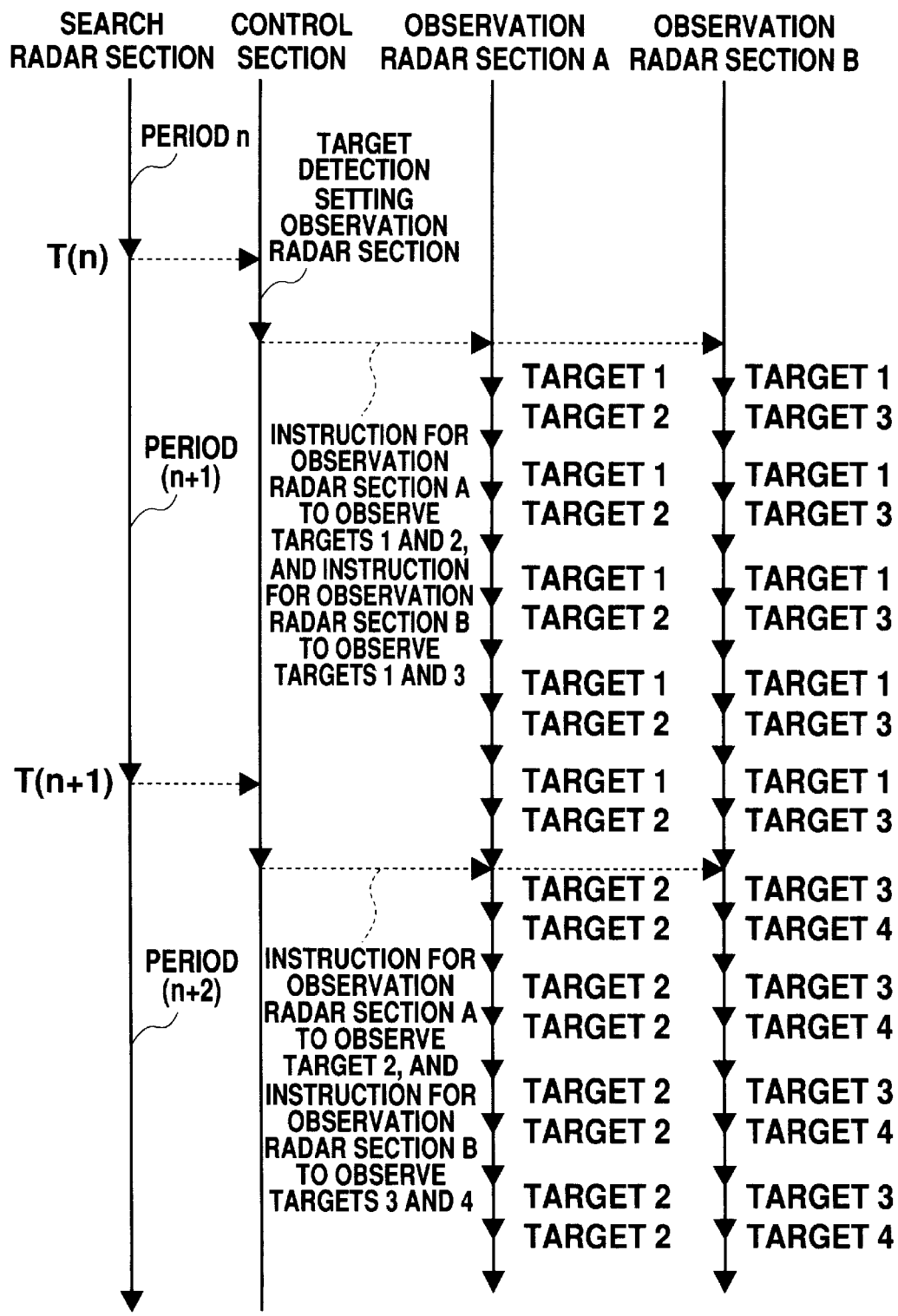
FIG. 16 is a chart schematically illustrating the operation of the meteorological radar system according to the seventh embodiment.

FIG. 16 is a schematic diagram explaining an example of the operation of the meteorological radar system of the present embodiment. In the control section 706, the radar integrated control section 706 controllably drives the search radar section 4. The control section 702 sets the observation radar section 24 according to the target detected with the end timing T(k) of the k-th period. In this example, the search radar section 4 detects three targets 1, 2, and 3 as targets by scanning with period n. At time T(n), the control section 702 instructs the observation radar section A to observe the objects 1 and 2 and the observation radar section B to observe the targets 1 and 3. In such a condition, the control section 702 judges that the object 1 is covered by the observation radar sections A and B and instructs these sections to observe object 1 as a target. The radar integrated control section 706 in the control section 702 sets the scanning range based on, for example, data from the search radar section 4 to the observation radar control section 26 in each of the observation radar sections A and B. When the scanning ranges of the observation radar section A are set to the values corresponding to the targets 1 and 2, the search radar section 4 observes them alternately and repetitively based on the scanning ranges while searching during the period (n+1). Moreover, when the scanning ranges of the observation radar section B are set to the values corresponding to the targets 1 and 3, the search radar section 4 observes them alternately. When deciding the scanning range of each target, the control section 702 can make use of various kinds of data obtained from the meteorological instrument network 700.

Until the radar integrated control section 706 varies the setting of the observation radar control section 26, the observation radar section A continues to observe the targets 1 and 2 alternately while the observation radar section B continues to observe the targets 1 and 3 alternately. This variation is performed at the timing T(n+1) at which the scanning period (n+1) of the search radar section 4 has been completed. In the example of FIG. 16, the search radar section 4 detects three objects 2, 3, and 4 as targets during scanning with period (n+1). Based on the detected data, the control section 702 judges that the object 2 exists in the coverage of the observation radar section A while the objects 3 and 4 exist in the coverage of the observation radar section B. Then radar integrated control section 706, for example, instructs the observation radar section A to observe only the target 2 and the observation radar section B to observe the targets 3 and 4. In other words, the scanning range of the observation radar control section 26 in the observation radar section A is updated from the scanning ranges corresponding to two objects 1 and 2 which is set before period (n+1) starts to only the scanning range corresponding to a new location of the object 2. On the other hand, the scanning range of the observation radar control section 26 in the observation radar section B is updated from the scanning ranges corresponding to two objects 1 and 3 which is set before period (n+1) starts to the scanning range corresponding to the object 3 at a new location and the scanning range corresponding to the object 4 newly detected. In such an operation, the observation radar section A repetitively scans and observes the object 2, while the observation radar section B alternately scans and observes the objects 3 and 4.

In the meteorological radar system according to the present invention, the search data capturing section searches the predetermined search area. Next, the object location detecting section detects the location of the object from the search data. Then, the observation radar antenna is directed within the decided scanning range to observe the object. This feature allows the observation radar to neglect the detecting operation of an object over wide ranges, so that the object can be effectively measured with higher space resolution by narrowing the beam width. Moreover, since the search data capturing section detects an object, the observation radar can continuously observe it, so that the time resolution in observation can be improved.

In the meteorological radar system according to the present invention, the search radar section may consist of a search radar set with a search radar antenna. The search radar set can effectively detect an object by scanning a wide area with a relatively short period and in real time.

In the meteorological radar system according to the present invention, the search radar antenna may implement a three-dimensional scanning operation including a rotational scanning in azimuth and an elevation angle varying operation, to further expand the object search range.

In the meteorological radar system according to the present invention, an object can be effectively found in a short search time when the search radar uses fan beams.

In the meteorological radar system according to the present invention, search data corresponding to the constant altitude PPI (CAPPI) display are created based on data obtained through the three-dimensional scanning of the search radar. With the CAPPI display, the operator can easily understand observation conditions obtained by the system.

Also according to the present invention, the meteorological radar system includes a movement forecast section that forecasts the location of an object based on past search data or that forecasts the location of an object based on past high-resolution observation data. As a result, even when an object is moving faster than the period for detection by the search radar, the object can be continuously tracked and observed.

Furthermore, in the meteorological radar system according to the present invention, the observation radar sets are distributed different places and are integrally controlled together with the search radar. This configuration can effectively observe wide areas.

What is claimed is:

1. A meteorological radar system for detecting and observing a moving object, comprising:

an observation radar antenna to be directed to said object;

a search data obtaining section for obtaining search data on a search area;

an object location detecting section for detecting the location of said object based on said search data to obtain location information;

a scanning range deciding section for deciding a scanning range of said observation radar antenna based on said location information detected; and an observation radar control section for scanning and driving said observation radar antenna in accordance with said scanning range.

2. The meteorological radar system defined in claim 1, wherein said search radar obtaining section comprises:

a search radar antenna for scanning said search area; and a search radar control section for scanning and driving said search radar antenna.

3. The meteorological radar system defined in claim 2, wherein said search radar control section implements a three-dimensional scanning operation using said search radar antenna, said three-dimensional scanning operation including a rotational scanning in an azimuth and an elevation angle varying operation.

4. The meteorological radar system defined in claim 3, wherein said search data obtaining section further comprises a search data processing section for creating search data corresponding to a constant altitude PPI (Plane Position Indicator) presentation from data obtained through said three-dimensional scanning.

5. The meteorological radar system defined in claim 2, wherein said search radar antenna transmits a fan-shaped beam spreading over the elevation angle; and wherein said search radar control section implements a three-dimensional scanning operation using said search radar antenna, said three-dimensional scanning operation including a rotational scanning in azimuth and an elevation angle varying operation.

6. The meteorological radar system defined in claim 5, wherein said search data obtaining section further comprises a search data processing section for creating search data corresponding to a constant altitude PPI (Plane Position Indicator) presentation from data obtained through said three-dimensional scanning.

7. The meteorological radar system defined in claim 2, wherein said search radar antenna transmits a fan-shaped beam spreading over the elevation angle; and wherein said search radar control section controls said search radar antenna to rotationally scan the fan-shaped beam in azimuth.

8. A meteorological radar system for detecting and observing a moving object, comprising:
   an observation radar antenna to be directed to said object;
   a search data obtaining section for obtaining search data in a search area, said search data obtaining section including a search radar antenna for scanning said search area and a search radar control section for scanning and driving said search radar antenna;
   an object location detecting section for detecting the location of said object from said search data to obtain location information;
   a scanning range deciding section for deciding a scanning range of said observation radar antenna in accordance with said location information;
   an observation radar control section for scanning and driving said observation radar antenna based on said scanning range; and a movement forecasting section for forecasting the location of said object based on previous search data obtained with said search radar antenna.

9. A meteorological radar system for detecting and observing a moving object, comprising:
   an observation radar antenna to be directed to said object;
   a search data obtaining section for obtaining search data in a search area, said search data obtaining section including a search radar antenna for scanning said search area and a search radar control section for scanning and driving said search radar antenna;
   an object location detecting section for detecting the location of said object based on said search data to obtain location information;
   a scanning range deciding section for deciding a scanning range of said observation radar antenna based on said location information detected by said scanning range deciding section;
   an observation radar control section for scanning and driving said observation radar antenna based on said scanning range; and a movement forecasting section for forecasting the location of said object from previous high-resolution observation data obtained with said observation radar antenna.

10. A meteorological radar system for detecting and observing a moving object, comprising:
   plural observation radar antennas to be directed to said object, said antennas each located at a different spot;
   a search radar antenna for scanning a search area; and
   a control section connected to said plural observation radar antennas and said search radar antenna, for controlling the scanning and drive operation of said plural observation radar antennas and said search radar antenna; said control section comprising:
   a search radar control section for scanning and driving said search radar antenna;
   an object location detecting section for detecting the location of said object based on search data to obtain location information;
   a scanning range deciding section for deciding respective scanning ranges of said plural observation radar antennas based on said location information detected;
   an observation radar control section for respectively scanning and driving said plural observation radar antennas based on said scanning ranges; and
   a high-resolution observation data processing section for creating high-resolution observation data of said object based on data received by each of said plural observation radar antennas.

* * * * *

UNITED STATES PATENT AND TRADEMARK OFFICE
CERTIFICATE OF CORRECTION

PATENT NO. : 6,018,307
DATED : January 25, 2000
INVENTOR(S) : Wakayama et al.

Page 1 of 1

It is certified that error appears in the above-identified patent and that said Letters Patent is hereby corrected as shown below:

Between "[22] Filed: October 5, 1998 and [51] Int. Cl.$^7$ ................G01S 13/95",
insert -- [30] Foreign Application Priority Data
March 30, 1998    [JP]    Japan .........................10-84090 --

Signed and Sealed this

Fourth Day of December, 2001

Attest:

NICHOLAS P. GODICI
Attesting Officer
Acting Director of the United States Patent and Trademark Office